DIFFERENTIAL PISTON CONTROL SYSTEM
Filed May 18, 1966
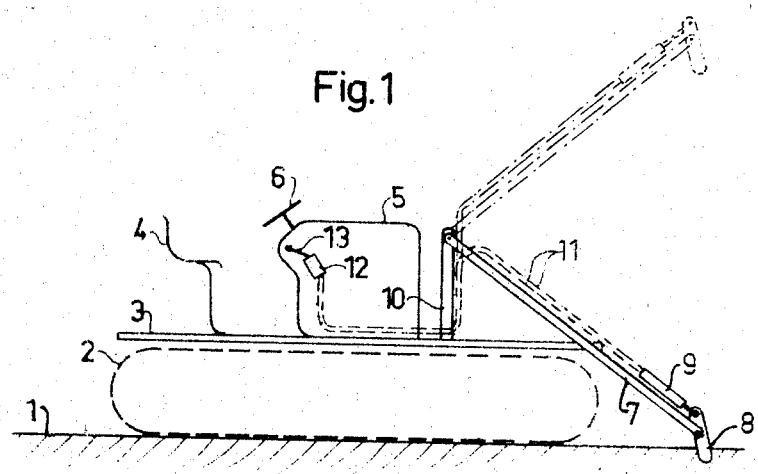
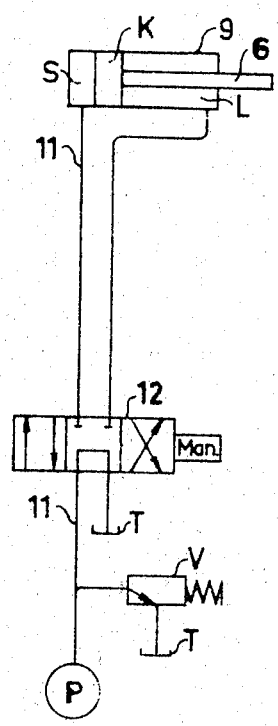
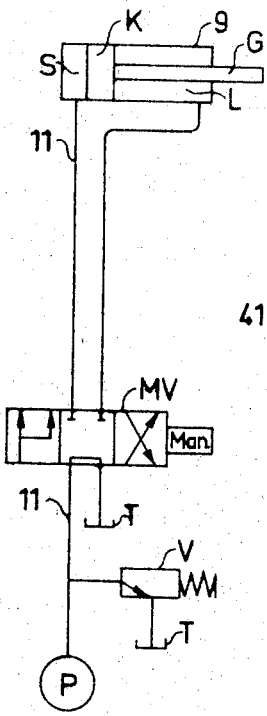
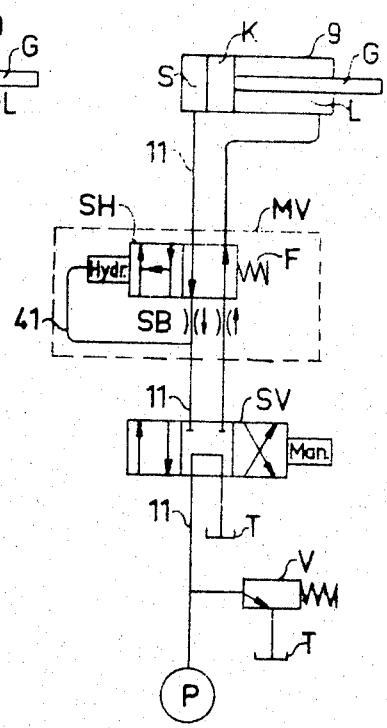

3,438,307
DIFFERENTIAL PISTON CONTROL SYSTEM
Gösta Ahlenius, Iggesund, Sweden, assignor to
Trima AB, Iggesund, Sweden
Filed May 18, 1966, Ser. No. 551,164
Claims priority, application Sweden, May 20, 1965,
6,614/65
Int. Cl. F15b *13/042*
U.S. Cl. 91—436    5 Claims

ABSTRACT OF THE DISCLOSURE

A hydraulic control system for operating a differential piston of a loading vehicle having a manually operated select valve and an automatically operated hydraulic control valve. The hydraulic control valve comprises a hydraulic pressure responsive slide valve to permit communication between the chambers on each side of the piston in one position and prevent communication in the second to thereby permit rapid movement of the piston in one direction and slower movement of the piston in the opposite direction.

---

Figure 5:
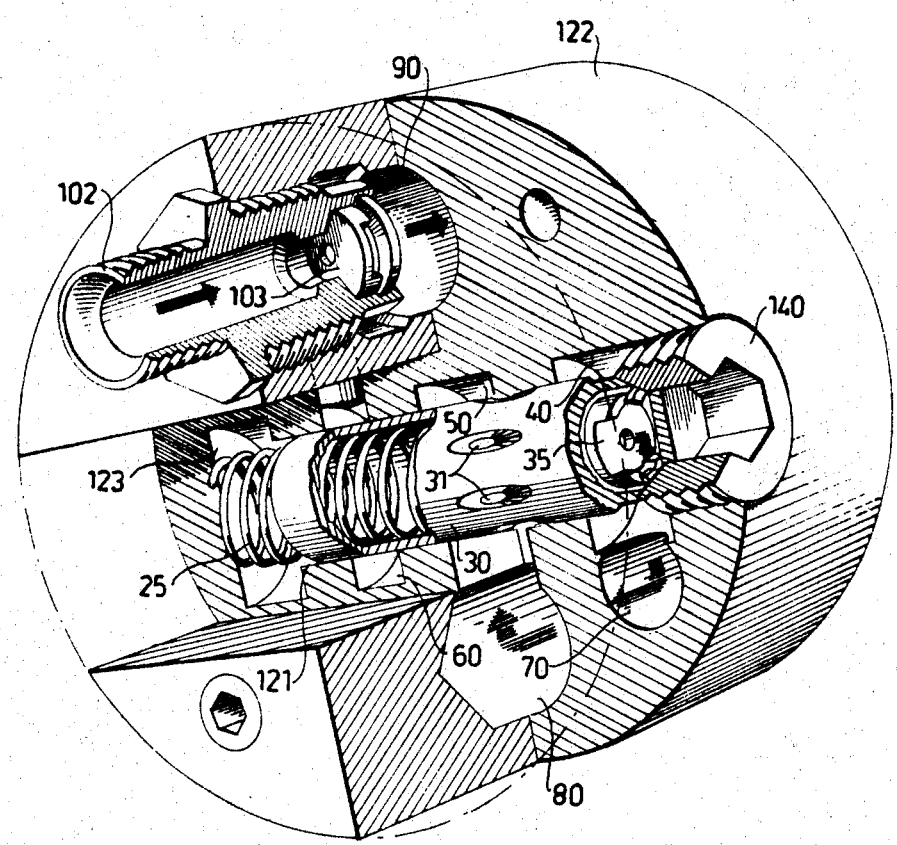

The present invention relates to a differential piston control system allowng a simultaneous connection of the two chambers on both sides of the piston in a hydraulic cylinder provided with a double acting piston to a pressure fluid source by means of a control valve interposed between said source and the hydraulic cylinder. Such a control system implies in principle that the velocity and the power of the double acting piston is equal to that of a single acting piston having the same dimension as the piston rod of the double acting piston.

This characteristic of the control system may find various applications.

A possible field of application may for instance be found in road construction machines, loading machines, cranes and the like. FIGURE 1 is a schematic view of a caterpillar loader of known construction. The soil is designated by a reference numeral 1, the caterpillar belt by 2, the frame by 3, the driver's seat by 4, the engine by 5, the steering wheel by 6, the push arm by 7, the tool holder by 8 and the hydraulic cylinder actuating the tool holder by 9. The push arm is pivotally mounted on an upright 10 secured to the frame. The uppermost position in which the push arm can be moved by means of an hydraulic cylinder (not shown) is indicated in dashed lines. The hydraulic cylinder 9 is actuated via two pressure lines 11 shown in dashed lines, the pressure fluid supplied to said lines by a pump (not shown) being controlled by means of a control valve 12, which can be manually operated by a lever 13.

FIGURE 2 is a schematic view of how this control system is designed on prior art machines. Pressure fluid is pumped by a pump P through the line 11 (which is protected by an overflow valve V) to the tank T when the control valve 12 is in middle position.

When the valve slide is moved to the right by means of the lever 13, pressure fluid is supplied through the line 11 to the cylinder chamber S in which the piston has a large area, and the piston is moved to the right carrying out the intended work by means of the piston rod G. At the same time fluid is forced out of the chamber 9 corresponding to the smaller area of the piston and flows back to tank T via the return line. As appears from FIGURE 1 this piston motion corresponds in fact to the return motion of the tool holder 8 which may carry a bucket for instance. This motion is thus carried out with unnecessary high power but low velocity owing to the large effective piston area in chamber S.

If, on the other hand, said slide valve in FIGURE 2 is moved to the left, the direction of flow in line 11 is reversed and the pump supplies pressure fluid to the chamber L corresponding to the smaller piston area. In this case the piston travels with a higher velocity but with lower power due to the smaller piston area. As appears from FIGURE 1 this motion, however, corresponds to the working stroke in the assumed case where a high power is required instead.

In the case just mentioned the problem is thus to combine a high pulling-up power and a fast dumping. Moreover, there is the essential requirement of a protected cylinder and ram location. Those three requirements may possibly be satisfied by providing a mechanical gearing to reverse the piston function. Such a construction is, however, unnecessarily complex, expensive and liable to damage.

I have found that it would be possible to interpose a control valve MV of the kind shown in FIGURE 3 (in which the references are the same as used previously) in the pressure line to a hydraulic cylinder 9. The advantage of such a control system will be, as desired, that the working stroke of the double acting piston corresponds to the retracting motion of the piston in the cylinder while the return stroke corresponds to the piston being moved out of the cylinder. In this connection it is desirable that the piston rod area be as small as possible so that a large effective piston area may be obtained. This results, however, in a high ratio between the piston head area and the piston rod area so that the quantity of fluid to be transferred per time unit from the front side to the rear side of the piston is large in relation to the fluid quantities supplied by the pump. Since the capacity of the machine pump is generally limited this ratio implies that the system arrangement shown in FIGURE 3 cannot be used in practice. This will be understood by the following numerical examples. If for instance the piston head area is four times larger than the piston rod area and if the actual pump capacity amounts to 25 l./min., the quantity of fluid to be transferred from one side of the piston to the other one will amount to 75 l./min.

It would also be possible to use a control valve with particularly wide channels but I have found that with respect to the required pressure line lengths the practically available pump capacities are not sufficient to overcome the flow losses in the system.

The present invention has for its object to obviate the aforesaid drawbacks and is essentially characterized in that the hydraulic cylinder control valve is located immediately adjacent to said cylinder. The control valve is preferably built up with said cylinder and, according to an embodiment of the invention, the control valve body has the same cross-sectional area as the hydraulic cylinder and it is built up with the cylinder end opposite to the piston rod.

According to a further embodiment of the invention the control valve is remote-controlled and preferably arranged as a differential valve which is operated by means of the pressure fluid actuating the piston.

According to a further embodiment of the invention the control member of the differential valve is constituted by valve slide which is actuated against a spring bias by the pressure fluid by means of a throttling disk. Said valve slide can be constituted by a sleeve with side openings for the interconnection of the valve chambers connected to the respective chambers in the hydraulic cylinder.

According to a further embodiment of the invention the differential valve can also be remote controlled by means of a manually actuated four way pilot valve interposed in the fluid supply line between the pump and the differential valve.

According to a characteristic of the invention the pilot valve constitutes the control means for the hydraulic cylinder actuating the tool in a tractor loader.

A further suitable field of application for the differential piston control system according to the invention is the control of a double-acting system operating with the same velocity in both directions. In this case the piston rod area can be dimensioned so as to amount to half the piston head area whereby the use of the differential control system according to the invention makes it possible to obtain the same effective area in both travel directions and thus also the same velocity of displacement in both directions. Such a control system is suitable for instance for the hydraulic operation of the table of a surface grinding machine.

A further field of application can be found in presses with fast piston travel in the working direction, i.e. the direction in which the piston power is highest. The differential piston control system according to the invention can in that case be used to convert power into speed.

The invention will now be described more in detail with reference to FIGURES 4–9 in the appended drawings.

In the embodiment of the invention shown in FIGURE 4 the hydraulic cylinder has as previously been designated by reference number 9, the piston by K, the piston rod by G, the cylinder chamber adjacent the larger piston area by S and the cylinder chamber adjacent the smaller piston area by L. The pump is designated by P and the fluid lines by 11. The fluid tank is designated by T and the overflow valve by V. The control valve MV is arranged as a differential valve in which a hydraulically operable slide valve SH biased by a spring F can be driven into two different positions, namely one position in which the fluid can return from the chamber S while being supplied to the chamber L and another position in which pressure fluid is supplied by the pump through the line 11 to the cylinder chamber S which at the same time is connected to the cylinder chamber L by a bypass in the valve slide so that fluid flows directly from the latter chamber to the cylinder chamber S. The hydraulic operation of the valve slide is schematically indicated by a duct 41 and the control valve or the differential valve MV can be operated by a pilot valve SV which is constituted by a manually operated four-way valve with three different positions. In FIGURE 4 the pilot valve is shown in neutral position and fluid is pumped by the pump into the tank T. When the pilot valve SV is moved into its left hand position fluid is supplied by the pump to the right hand supply line 11 up to the cylinder chamber L adjacent the smaller piston area and fluid is forced out of the other cylinder chamber S through the left hand fluid line 11 and the valve MV to the tank T. If one wishes to switch over the piston K in the reverse motion in the hydraulic cylinder 9, the pilot valve SV is moved into the right hand position whereby fluid is supplied by the pump through the left hand supply line 11 to the cylinder chamber S corresponding to the larger piston area. Owing to a throttling disk SB or the like, fluid is branched off through the duct 41 so that the valve slide SH due to the pressure drop across the disk SB is hydraulically moved in the right hand direction against the bias of the spring F. The valve slide SH comes into its right hand position and thus directly interconnects the cylinder chambers L and S so that a rapid flow of fluid may occur between the chambers. The control valve MV arranged as a differential valve is placed immediately adjacent to the hydraulic cylinder 9 so that the resistance to flow in that part of the lines 11 which is comprised between the hydraulic cylinder 9 and the differential valve MV is of no significance.

Figure 6:
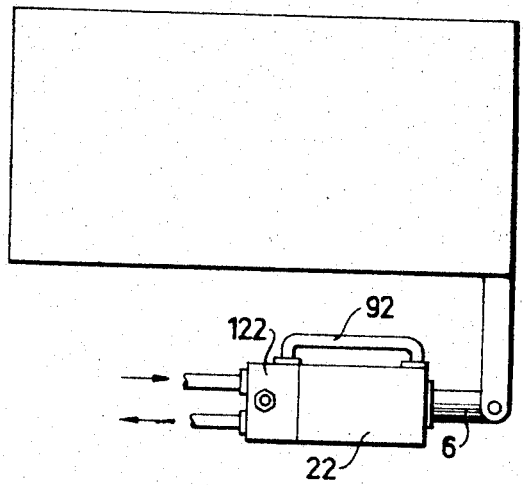
Figure 7:
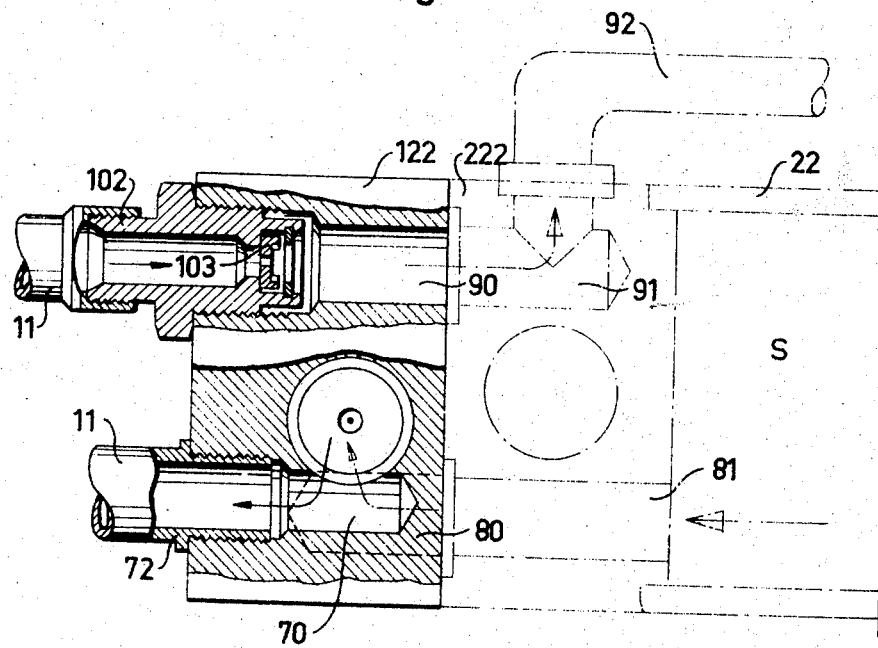

An embodiment of a differential valve according to the invention is shown in FIGURES 5, 7, 8 and 9. The control valve according to this embodiment is intended to be hydraulically interposed between a four-way valve of the kind designated by SV in FIGURE 4 and a hydraulic cylinder with a double acting piston, in which case said control valve is operating as a differential valve MV as described with reference to FIGURE 4. The differential valve body 122 (FIGURES 5–9) has the same cross section as the hydraulic cylinder 22 (FIGURE 7) and, as appears from the FIGURE 7, is arranged to be fitted on that end of the hydraulic cylinder 22 which is opposite to the piston rod 6. The valve body is provided with two connecting nipples 102 and 72 for the incoming flow lines 11. The nipples terminate in a passage duct 90 and an inlet duct 70, respectively. The passage duct 90 is connected to an angle duct 91 provided in the end plate 122 of the hydraulic cylinder, which latter duct 91 is in its turn connected via a U-shaped pipe 92 to the hydraulic cylinder chamber L corresponding to the smaller piston area as appears from FIGURES 4 and 6. The hydraulic chamber S corresponding to the larger piston area is connected via the duct 81 and the cylinder end plate 222 to a duct 80 in the differential valve body 122.

In this way the differential valve duct 90 is connected to the cylinder chamber L corresponding to the smaller piston area while the valve duct 80 is connected to the chamber S corresponding to the larger piston area.

All the aforesaid ducts in the valve body are extending in the axial direction of said valve body and are arranged so that enough space is provided between them for a diametrically directed valve means. In the embodiment shown said valve means is arranged in a bore provided in the valve body between the duct 90 on the one hand and the ducts 80 and 70 on the other hand, said bore extending diametrically across the valve body, i.e. perpendicularly to the axial direction.

Grooves 40, 50 and 60 are arranged in spaced relationship on the periphery of said bore 121. The groove 40 communicates with the duct 70, the groove 50 with the duct 80 and the groove 60 with the duct 90.

A tubular valve slide 30 biased by a spring 25 is provided in the bore 121, said valve slide 30 being peripherally provided with slits 31 which in the initial position of the valve slide register with the groove 50. At its open end opposite to the spring 25 the valve slide 30 communicates via a throttling disk 35 which is provided with a central passage, with the groove 40 and consequently also with the duct 70. The throttling disk 35 is arranged in such a way that it throttles to a higher degree the fluid flowing from the duct 70 towards the inside of the valve slide than the fluid flowing in the opposite direction. The stroke of the valve slide 30 in direction of the periphery of the valve body 122 is limited in one direction by the bottom 123 of the bore 121 and in the other direction by a plug 140 screwed into the valve body.

Figure 8:
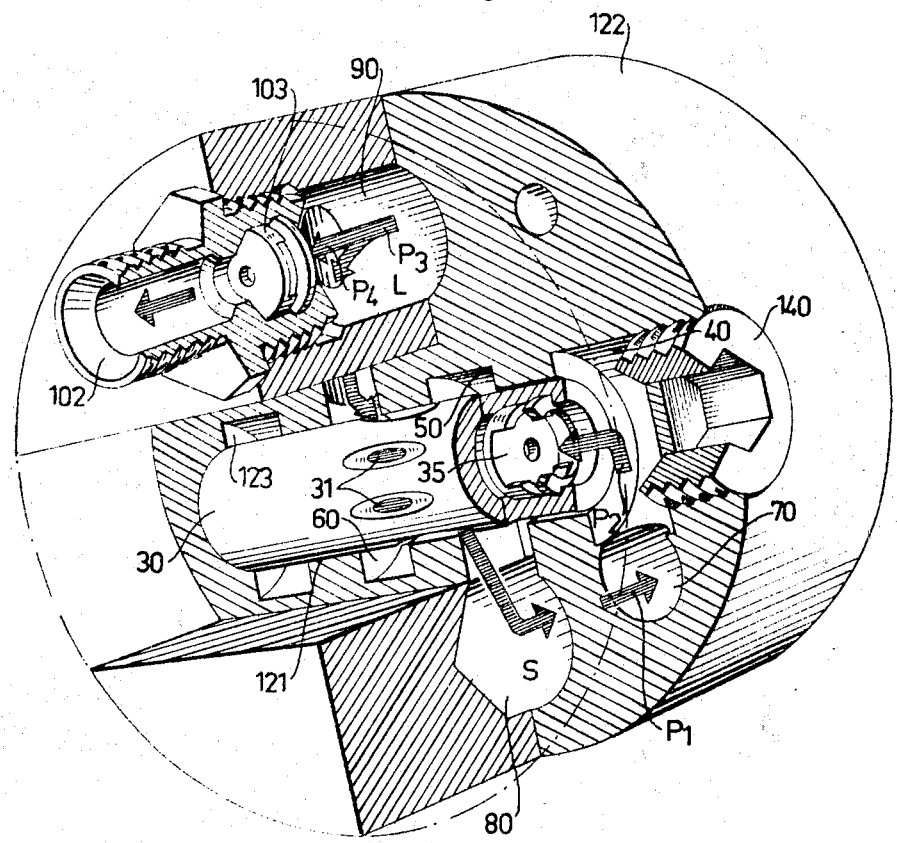
Figure 9:
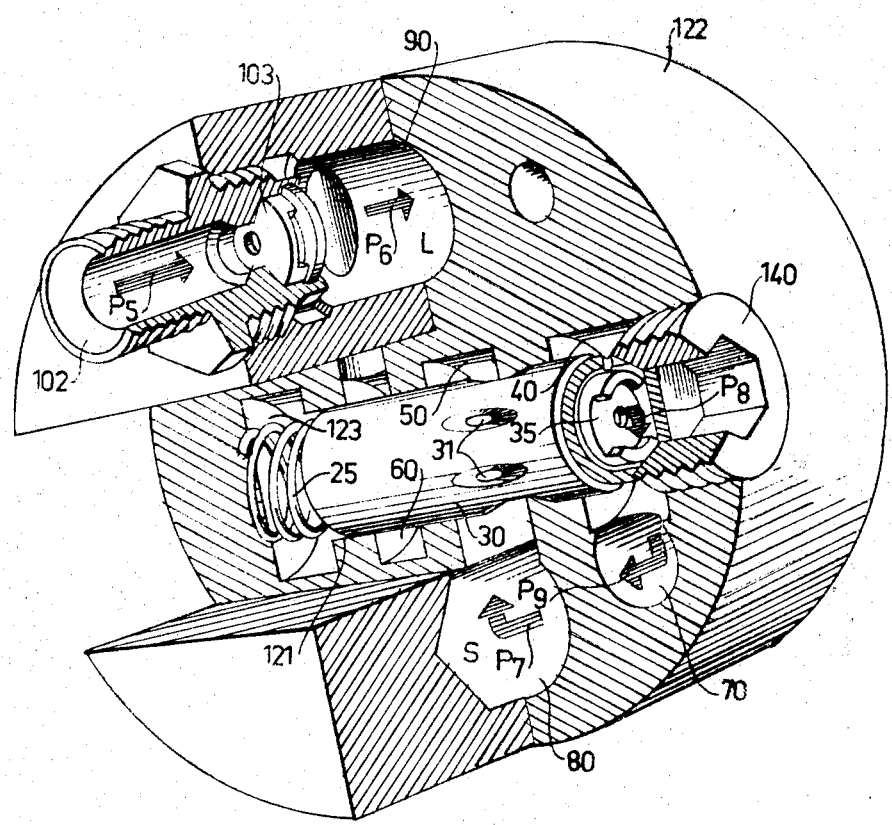

The operation of the differential valve MV will now be described with reference to FIGURES 8 and 9. In FIG. 8 slide valve 30 is shown in its extreme leftward position.

Pressure fluid supplied to the duct 70 (FIGURE 8) when the pilot valve SV is set in its left hand position (FIGURE 4), flows through the groove 40 and the central passage in the throttling disk 35 as indicated by the arrows P1, P2. A pressure drop appears in the fluid flow on the down-stream side of the throttling disk 35 so that the latter presses the valve slide 30 towards the bore bottom 123. As the slits 31 reach the edge of the groove 60 a direct connection is established between the duct 80 and the duct 90, i.e. between the chambers S and L on each side of the piston, which connection increases the piston velocity. Said throttling valve operation will depend on the quantity of flow forced by the pump P (FIGURE 4) through the pilot valve SV and the channel 70, i.e. it will depend upon how much the pilot valve SV is open. The differential valve MV thus exactly follows the operation of the valve SV.

As appears from FIGURE 8 the fluid (see arrow P3) passes from the chamber L to the chamber S through the valve slide 30, a fraction of the fluid (arrow P4)

flowing back to the nipple 102 through a hole in a throttling disk 103 provided in said nipple, said throttling disk 103 being of the same type as the aforesaid throttling disk 35. Since the cylinder chamber S is considerably larger than the chamber L the difference in volume between both these chambers plus the leakage fluid returning through the throttling hole in the nipple 102 will be replaced by fresh fluid from the channel 70 through the hole in the throttling disk 35, which leads to a slow filling of the chamber S, i.e. a low piston velocity.

When the oil supply is shut off the valve slide returns in its initial position and the piston motion is stopped.

Summarizing, one may say that the resistance to the motion of the valve slide increases the more the spring is compressed whereby the displacement of the valve slide and also the opening degree between the grooves 50 and 60 will depend upon how much fluid is supplied to the duct 70. The velocity of the piston can thus be adjusted very easily.

If the pilot valve SV (FIGURE 4) is instead moved to its right hand position so that fluid is supplied to the differential valve MV through the nipple 102 (FIGURE 10) the fluid flow will be as indicated by the arrows P5 and P6. The fluid thus passes through the throttling disk 103 and via the ducts 90, 91 in the pipe 92 (FIGURES 6 and 7) to the cylinder chamber L. The piston is thus moved inwardly in the cylinder and the return fluid from the chamber S flows through the duct 80, the valve slide 30, the central passage of the throttling plate 35 and the groove 40 to the duct 70 as indicated by the arrows P7, P8 and P9.

Due to the fact that in this case the throttling disk 103 is unoperative one obtains a rapid filling of the smaller cylinder chamber L, and due to the fact that the return fluid from the chamber S can flow without being opposed by the throttling disk 35, the fluid in the chamber S does not prevent a rapid motion of the piston.

Summarizing, it can be said that in the embodiment described the piston rod is pushed slowly out of the cylinder by fluid supplied through the duct 70 due to the throttling provided by the throttling disk 35. At the same time a pressure increase occurs in the chamber S due to the transfer of fluid from the chamber L through the valve slide 30 to the duct 80.

The retraction of the piston rod on the contrary occurs rapidly due to the fact that in this process both throttling disks are inoperative.

In FIGURE 6 the invention is assumed to be supplied for producing a to-and-fro motion of a surface grinding machine table moving at the same speed in both directions.

What I claim is:

1. A differential piston control system arranged to allow a simultaneous connection of first and second chambers on opposite sides of a double acting piston in a hydraulic cylinder comprising; a pressure fluid remote control valve integral with one end of the said hydraulic cylinder, said valve having first and second fluid conduits selectively connectable to a pressure fluid source, said valve being further provided with first and second passages communicating, respectively, with said first and second chambers of said hydraulic cylinder, and a hydrostatically balanced slide valve communicating between said first and second conduits and said first and second passages, said slide valve comprising a hollow tubular valve slide having a throttling disc with a central passage therethrough and a plurality of longitudinally extending tapered slots on the outer surface thereof, said slide throttling disc being in fluid communication with said second fluid conduit such that the flow of fluid in the direction from said second fluid conduit to said hydraulic cylinder is throttled more than in the opposite flow direction, said slide being longitudinally movable within a cylindrical housing between first and second positions, said cylindrical housing having at least first and second spaced annular grooves in an inner wall thereof, said first groove communicating with said first fluid conduit and said first passage, said second groove communicating with said second passage, said grooves being spaced such that when said slide is in said second position said slide prevents fluid communication between said first and second chambers of said hydraulic cylinder and when said slide is in said first position said slots interconnect said first and second grooves to provide communication between said chambers whereby fluid flows from said first chamber to said second chamber and wherein said tapered longitudinal slots present successively increasing flow areas as said slide is moved from said second position to said first position.

2. A differential piston control system as in claim 1 wherein said slide is spring biased towards said second position and is biased towards said first position by throttled fluid pressure.

3. A differential piston control system as in claim 2 wherein said first fluid conduit is provided with a throttling disc arranged such that the flow of fluid in the direction towards said pressure fluid source from said first passage is throttled more than in the opposite direction.

4. A differential piston control system as in claim 3 wherein a manually operable four-way pilot valve is provided between said pressure fluid source and said remote control valve to selectively connect said first and second conduits to said pressure fluid source.

5. A differential piston control system as in claim 4 wherein said manually operable four-way valve in one position connects said first fluid conduit to said pressure fluid source and in a second position connects said second fluid conduit to said pressure fluid source, said four-way valve when in said second position allowing fluid to pass through said throttling disc in one end of said slide to thereby move said slide from said second position to said first position to thereby interconnect said first and second chambers of said hydraulic cylinder.

References Cited

UNITED STATES PATENTS

| 2,158,737 | 5/1939 | Wunsch | 251—325 |
| 3,123,335 | 3/1964 | Darling | 251—325 |
| 2,890,683 | 6/1959 | Pilch | 91—438 |
| 3,241,461 | 3/1966 | Drone | 91—436 |

FOREIGN PATENTS 863,701   3/1961   Great Britain.

CARROLL B. DORITY, JR., *Primary Examiner.*